United States Patent
Winter

[15] 3,693,689
[45] Sept. 26, 1972

[54] PNEUMATIC TIRE

[72] Inventor: Hans Joachim Winter, Bereldange, Luxembourg

[73] Assignee: The Goodyear Tire & Rubber Company, Akron, Ohio

[22] Filed: Oct. 13, 1970

[21] Appl. No.: 80,363

[52] U.S. Cl. ............................................. 152/361
[51] Int. Cl. .............................................. B61c 9/18
[58] Field of Search ................................. 152/361

[56] References Cited

UNITED STATES PATENTS 2,982,328   5/1961   Emanueli et al. ........... 152/361
2,996,097   8/1961   Lugli ........................... 152/361

*Primary Examiner*—Gerald M. Forlenza
*Assistant Examiner*—George H. Libman
*Attorney*—F. W. Brunner and Harlan E. Hummer

[57] ABSTRACT

A radial tire with a pair of folded breaker strips for annularly reinforcing the tire. An unfolded breaker strip, laterally spanning the folded breaker strips, is positioned between the carcass plies and nearest folded breaker. The unfolded breaker includes reinforcing cords having an angular disposition between the angles of the cords reinforcing the carcass plies and folded breakers.

12 Claims, 3 Drawing Figures

INVENTOR
HANS J. WINTER

ATTORNEY 3,693,689

PNEUMATIC TIRE

BACKGROUND OF THE INVENTION

The invention is particularly well suited for radial tires with folded belts, especially folded belts having reinforcing cords disposed at angles substantially smaller than the angular disposition of the reinforcing cords in the carcass plies. The large angular discrepancy between these cords results in unfavorable force transmission between the breakers and carcass, especially at high speeds. The invention is directed to an improved breaker construction for eliminating or substantially reducing this problem.

Briefly stated, the invention is in a pneumatic tire having at least one carcass ply reinforced with cords which are practically meridian, i.e. disposed at angles in the range of from 70° to 90° measured from a plane C-P passing through the mid-circumferential centerline of the tread of the tire, such plane hereafter referred to as the centerplane (CP). A pair of folded breakers are disposed between the carcass ply and tread of the tire, and each folded breaker has reinforcing cords which are disposed at similar angles in the range of from 10° to 25° measured in opposite directions from the centerplane (CP). The folded edges of each breaker are in further spaced relation from the centerplane (CP) than the free ends of the adjacent folded breaker. At least one other unfolded breaker is interposed between the carcass ply and closest folded breaker, and the lateral edges of the unfolded breaker are in farther spaced relation from the centerplane (CP) than the folded edges of the folded breakers. Moreover, the unfolded breaker is reinforced with cords disposed at angles which, numerically, are intermediate the angles of the carcass cords and corresponding measured closest folded breaker cords.

The angular step-off between the breakers and carcass cords is reduced by using the unfolded breaker with reinforcing cords disposed at angles compatible with the angular disposition of the folded breakers and carcass cords. Moreover, the unfolded breaker helps prevent growth in diameter of the tire shoulders caused by centrifugal forces at high speeds. This intermediate unfolded breaker also reduces the oscillating tensions between the carcass and folded breakers during high speed, and prevents excessive heat build-up caused by radial movement of the tread and breaker. It was also discovered that the intermediate unfolded breaker improved tread wear, especially in the shoulder area, and lateral stability of the tire.

DESCRIPTION OF THE DRAWING

The following description of the invention will be better understood by having reference to the annexed drawing, wherein.

DESCRIPTION OF THE INVENTION

Figure 1:
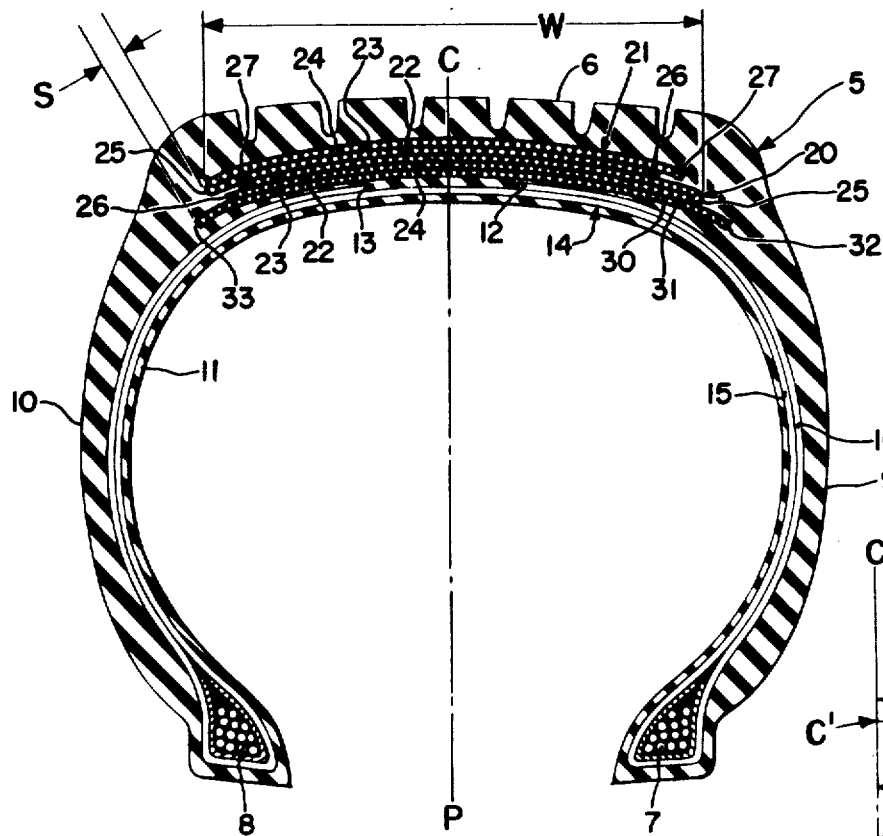
FIG. 1 is a cross-section of the tire showing the unfolded breaker in relation to the folded breakers and carcass plies.

Referring more particularly to FIG. 1, there is shown a pneumatic tire, generally indicated at 5, having a toroidal configuration symmetrical from the centerplane (CP). The tire 5 essentially comprises a tread 6, a pair of beads 7 and 8, a pair of sidewalls 9 and 10 connecting the tread 6 and beads 7 and 8, and an air impervious innerliner 11.

The carcass, or main body of the tire 5, is of the envelope-type construction where the ends 12 and 13 of the cords 14 reinforcing the carcass, terminate in the area of the tread 6 in predetermined spaced relation from the centerplane (CP). Thus, in the area of the sidewalls 9 and 10 and portion of the tread 6, there are two layers 15 and 16 of carcass reinforcing cords 14. The reinforcing cords 14 of the layers or carcass plies 15 and 16, are preferably composed of rayon, nylon, or polyester.

Rayon is any manufactured fiber composed of regenerated cellulose, as well as manufactured fibers composed of regenerated cellulose in which substitutes have replaced not more than 15 percent of the hydrogens of the hydroxyl groups. Commercially available rayon cords, suitable for reinforcing tires, generally have a tenacity of at least about 4 ½ grams per denier.

Nylon is any manufactured fiber in which the fiber forming substance is any long chain synthetic polyamide having recurring amide groups as an integral polymer chain. Commercially available nylon cords are exemplified by Nylon 66 prepared by condensation of hexamethylene diamine and adipic acid, and Nylon 6 prepared by polymerization of caprolactam. Nylon cords, suitable for reinforcing tires, generally have a tenacity of at least about 8 grams per denier.

Polyester cords suitable for reinforcing tires are essentially a linear terephthalate. The polyester is ordinarily an alkaline terephthalate in which the alkaline group contains two to six or eight carbon atoms. The polymer has an intrinsic viscosity in phenol-trichloroethane (60:40) at 30° C. in excess of 0.55 and generally 0.80 or higher, a minimum melting point of 450° C. The polyester may be an ester of cyclohexane dimethanol and terephthalic acid. The polyester most generally used for reinforcing tires is polyethylene terephthalate. The polyester cords generally have a tenacity of at least about 6 ½ grams per denier.

Figure 2:
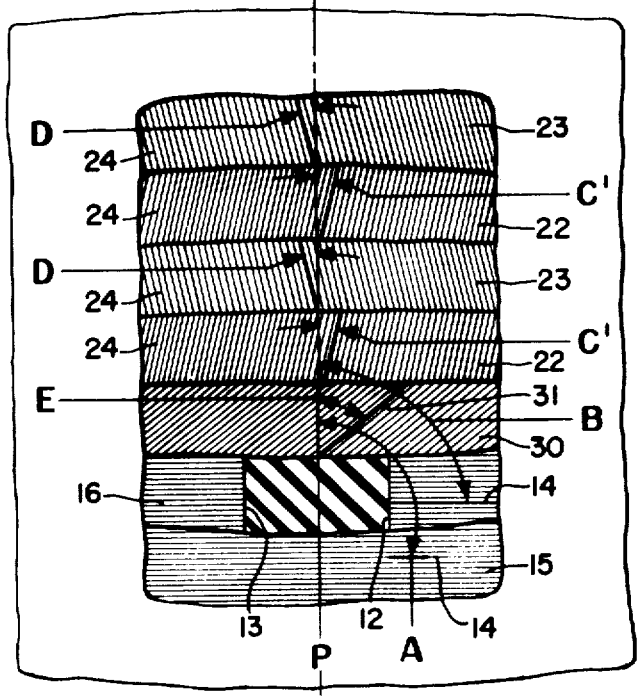
FIG. 2 is a cutaway portion of the tire showing the angular disposition of the reinforcing cords relative to the centerplane (CP) of the tire.

The cords 14, reinforcing the carcass plies 15 and 16 in the area of the tread 6, are practically meridian (FIG. 2); that is, disposed at similar angles (A) and (B) in the range of from 70° to 90° measured in opposite directions from the centerplane (CP). In this particular embodiment, the cord angle used was 90°. Any cord angles disclosed in the specification and claims are in reference to a tire which is molded, vulcanized and uninflated.

A pair of folded breakers, generally indicated at 20 and 21, are disposed in superimposed, radial spaced relation between the carcass plies 15 and 16, and the tread 6. Each of the breakers 20 and 21, comprises a couple of strips 22 and 23 of rubberized material with reinforcing cords 24 disposed at similar angles (C') and (D) which are considerably less, relative to the centerplane (CP), than corresponding angles of the carcass cords 14. The reinforcing cords 24 of each of the folded breakers 20 and 21 are, for example, disposed at angles (C') and (D) in the broad range of from 10° to 25° measured from the centerplane (CP), and in this particular case the angles (C') and (D) are equal and 13°, which is considerably less than the carcass cord angle of 90°. The cords 24 of adjacent strips 23 and 22 of the breakers 20 and 21, respectively, as well as the adjacent strips 22 and 23 of each of the breakers 20 and 21, are measured in opposite directions from the centerplane (CP). The lateral folded edge 25 of each folded breaker 20 and 21, is disposed in farther spaced relation from the centerplane (CP) than the free ends 26 and 27 of the adjacent strips 22 and 23. The reinforcing cords 24 of the breakers 20-21 are preferably composed of rayon, nylon, or polyester.

Figure 3:
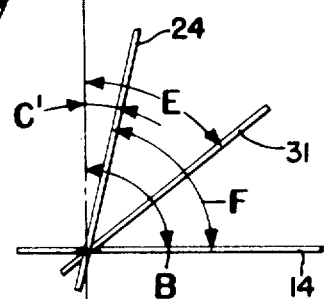
FIG. 3 is a diagram showing the angular disposition of the unfolded breaker cords in relation to the cords of the closest carcass ply and folded breaker whose cords extend in the same direction from the centerplane (CP).

A transition breaker 30 is interposed between the carcass plies 15 and 16, and closest folded breaker 20. The transition breaker 30 comprises a single, unfolded strip of rubberized material with reinforcing cords 31 disposed at similar angles (E) in the broad range of from 25° to 65° measured from the centerplane (CP), and in this particular case 51° measured in a counterclockwise direction from the centerplane (CP). For best results, the cords 31 of the transition or intermediate unfolded breaker 30 and the closest cords 24 of the adjacent folded breaker 20, should extend in similar directions from the centerplane (CP). Moreover, the cord angle (E), if possible, should preferably be the average value of the carcass cord angle and nearest folded breaker cord angle measured in the same direction from the centerplane (CP). For example, referring to FIG. 3, the cord 31 preferably bisects the angle (F) between the reinforcing cords 14 and 24. Thus, the angular disposition of the reinforcing cord 31 from the centerplane (CP) is determined by adding together the angle (C') of the reinforcing cord 24 and one-half the included angle (F) between the reinforcing cords 14 and 24, which in this case amounts to 51°. The reinforcing cords 31 of the unfolded breaker 30 are composed of any suitable material, e.g. rayon, nylon, or polyester. The textile cords reinforcing the breakers 20, 21, and 30, can be composed of similar material, in which case the specific properties of the cords, e.g. denier and twist, may differ.

The unfolded breaker 30 has a pair of opposing lateral edges 32 and 33, which are in farther spaced relation from the centerplane (CP) than the folded edges 25 of the folded breakers 20-21. It has been found that the spacing (S) between the lateral edges 32-33 of the unfolded breaker 30, and folded edges 25 of the folded breakers 20-21, should be at least 5 millimeters and preferably between 10-30 millimeters, depending on the overall folded width (W) of the breakers 20-21.

Thus, it can be appreciated that the large step-off angle between the carcass cords 14 and breaker cords 25 are broken by the angular disposition of the cords 31 in the transition breaker 30 and, as previously indicated, the reduction of this step angle leads to more favorable force transmission from the breakers to the carcass.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire, comprising:
   a. at least one carcass ply reinforced with cords disposed at angles in the range of from 70°-90° measured from the centerplane (CP) of the tire;
   b. a pair of folded breakers disposed between the carcass ply and tread of the tire for annularly reinforcing the tire, each folded breaker including at least one pair of strips, each of which has reinforcement cords disposed at similar angles, the cord angles of the reinforcement cords of adjacent strips being in the range of from 10°-25° measured in opposite directions from the centerplane (CP) of the tire, the folded edge of each folded breaker being in farther spaced relation from the centerplane (CP) than free ends of the adjacent folded breaker; and
   c. a single other breaker with reinforcing cords, interposed between the carcass ply and closest strip of the nearest folded breaker, said single breaker having lateral edges in farther spaced relation from the centerplane (CP) of the tire than the folded edges of the folded breakers, the reinforcement cords of the carcass ply, single breaker, and closest strip of the nearest breaker, extending in the same direction relative to the centerplane such that the cord angles of the cords are measured in the same direction from the centerplane, and the cord angle of said single breaker being, numerically, between the cord angles of the carcass ply and closest strip of the nearest folded breaker.

2. The pneumatic tire of claim 1, wherein the single other breaker is an unfolded breaker with reinforcing cords disposed at angles in the range of from 25°-65° measured from the centerplane (CP) of the tire.

3. The pneumatic tire of claim 2, wherein the unfolded breaker includes reinforcing cords angularly disposed in bisecting relation to the angle between correspondingly measured cords of the nearest carcass ply and closest strip of the nearest folded breaker.

4. The pneumatic tire of claim 2, wherein the folded breakers include reinforcing cords composed of material selected from the group consisting of rayon, nylon, and polyester.

5. The pneumatic tire of claim 4, wherein the unfolded breaker includes reinforcing cords composed of material selected from the group consisting of rayon, nylon, and polyester.

6. The pneumatic tire of claim 5, wherein the carcass ply includes reinforcing cords composed of material selected from the group consisting of rayon, nylon, and polyester.

7. The pneumatic tire of claim 2, wherein lateral edges of the unfolded breaker are spaced from the centerplane (CP) a distance (S) of at least 5 millimeters more than adjacent folded edges of the folded breakers.

8. The pneumatic tire of claim 7, wherein the spacing (S) is in the preferred range of from 10-30 millimeters.

9. A pneumatic tire, comprising:
   a. at least one carcass ply reinforced with cords disposed at angles in the range of from 70°-90° measured from the centerplane (CP) of the tire;
   b. a pair of folded breakers disposed between the carcass ply and tread of the tire for annularly reinforcing the tire, each folded breaker including at least one pair of strips each of which has reinforcement cords disposed at similar angles, the cord angles of the reinforcement cords of adjacent strips being in the range of from 10°–25° measured in opposite directions from the centerplane (CP) of the tire, the folded edges of each folded breaker being in farther spaced relation from the centerplane (CP) than free ends of the adjacent folded breaker; and c. at least one other unfolded breaker interposed between the carcass ply and closest strip of the nearest folded breaker, the unfolded breaker having lateral edges which are spaced a distance (S), measured from the centerplane (CP), of at least 5 millimeters more than adjacent folded edges of the folded breakers, the reinforcement cords of the carcass ply, unfolded breaker, and closest strip of the nearest breaker, extending in the same direction relative to the centerplane such that the cord angles of said cords are measured in the same direction from the centerplane, the cord angle of the unfolded breaker being, numerically, between the cord angles of the carcass ply and closest strip of the nearest breaker, and the unfolded breaker having reinforcing cords disposed at angles in the range of from 25°–65° measured from the centerplane (CP) of the tire.

10. The pneumatic tire of claim 9, wherein the reinforcing cords of the carcass, folded and unfolded breakers, are composed of material selected from the group consisting of rayon, nylon, and polyester.

11. The pneumatic tire of claim 10, wherein the spacing (S) is in the range of from 10–30 millimeters.

12. The pneumatic tire of claim 11, wherein the reinforcing cords of the unfolded breaker are disposed in bisecting relation to the angle between correspondingly measured cords of the nearest carcass ply and closest strip of the nearest folded breaker.

* * * * *